United States Patent

Kamel et al.

[11] Patent Number: 6,135,394
[45] Date of Patent: Oct. 24, 2000

[54] PRACTICAL METHOD AND APPARATUS FOR SATELLITE STATIONKEEPING

[75] Inventors: Ahmed A. Kamel, Los Altos; Walter Gelon, Redwood City; Keith Reckdahl, Palo Alto, all of Calif.

[73] Assignee: Space Systems/Loral, Inc., Palo Alto, Calif.

[21] Appl. No.: 09/207,399

[22] Filed: Dec. 8, 1998

[51] Int. Cl.$^7$ ............................................. B64G 1/40
[52] U.S. Cl. .................................... 244/172; 244/169
[58] Field of Search .............................. 244/158 R, 164, 244/169, 172

[56] References Cited

U.S. PATENT DOCUMENTS

| | | | |
|---|---|---|---|
| 5,239,820 | 8/1993 | Leifer et al. | 60/202 |
| 5,349,532 | 9/1994 | Tilley et al. | 244/164 |
| 5,443,231 | 8/1995 | Anzel | 244/169 |
| 5,716,029 | 2/1998 | Spitzer | 244/172 |
| 5,765,780 | 6/1998 | Barskey et al. | 244/169 |
| 5,813,633 | 9/1998 | Anzel | 244/169 |
| 5,823,477 | 10/1998 | York | 244/163 |
| 5,845,880 | 12/1998 | Petrosov et al. | 244/169 |
| 5,984,236 | 11/1999 | Keitel et al. | 244/172 |

*Primary Examiner*—Galen L. Barefoot
*Attorney, Agent, or Firm*—Kenneth W. Float

[57] ABSTRACT

A practical stationkeeping method and apparatus wherein an electric propulsion system on a satellite is used to correct north-south drift and the majority of east-west drift which is caused by orbital eccentricity growth. A chemical propulsion system on the satellite is used to correct the remainder of east-west drift due to the growth of orbital semimajor axis. The method and apparatus eliminate the need for additional electric thruster burns in case of an electric thruster failure and therefore eliminates associated power and mass penalties.

22 Claims, 3 Drawing Sheets

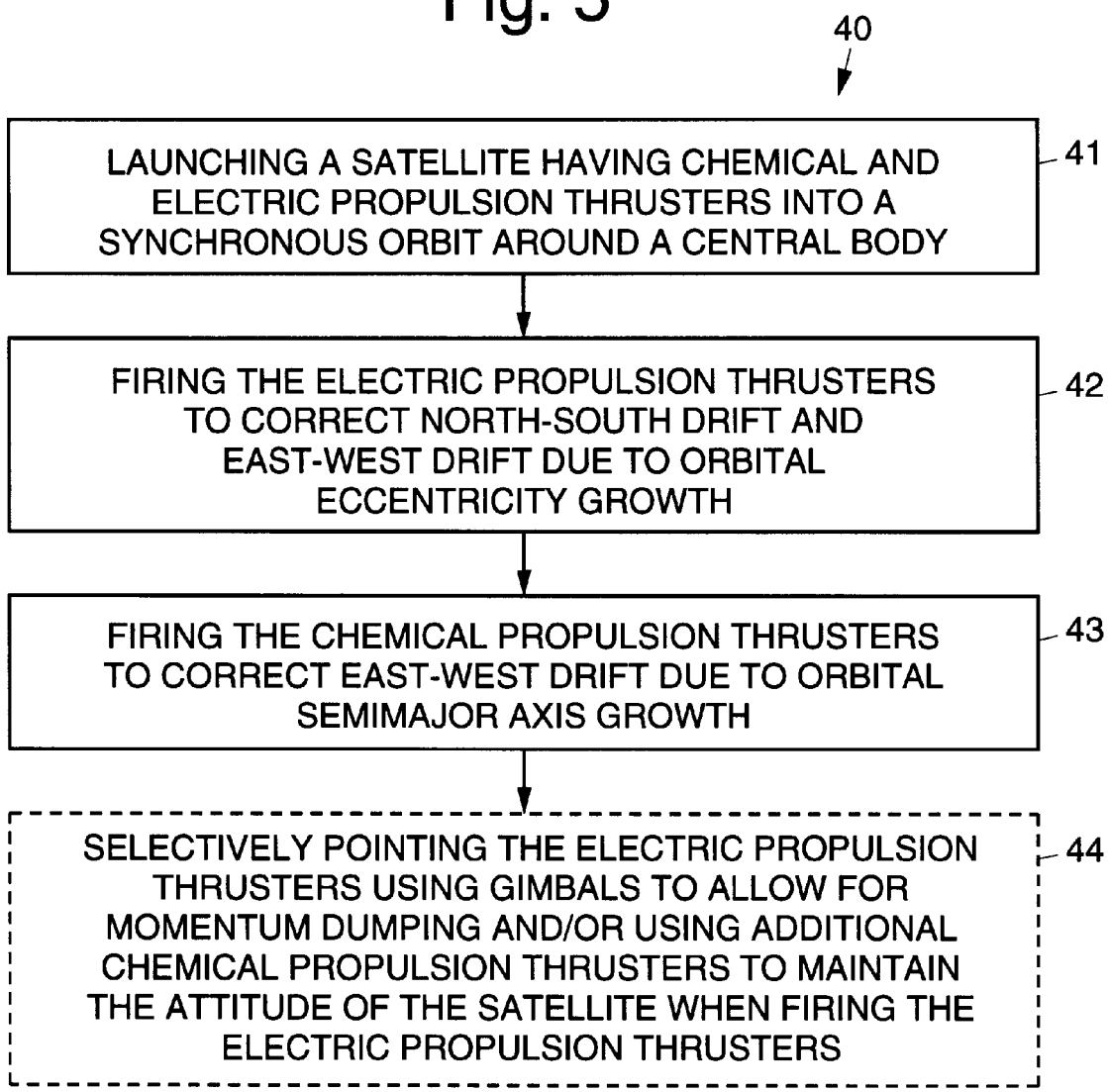

PRACTICAL METHOD AND APPARATUS FOR SATELLITE STATIONKEEPING

BACKGROUND

The present invention relates generally to satellite stationkeeping systems and methods, and more particularly, to such systems and methods that use an electric propulsion system to simultaneously correct orbital inclination and eccentricity growth and use a chemical propulsion system to correct orbital semimajor axis growth.

It is generally well known in the art that various forces act on synchronous satellites to move the satellite out of stationary orbit. These forces are due to several sources including the gravitational effects of the sun and moon, the nonspherical shape of the Earth and solar radiation pressure. To counter these forces, synchronous satellites are equipped with propulsion systems that are fired at intervals in order to maintain station at a desired longitude. This requires control of the orbital inclination, eccentricity and semimajor axis of the satellite. Inclination is a measure of the north-south position of the satellite relative to the Earth's equator. Eccentricity is the measure of the noncircularity of the satellite orbit. That is, the measure of the variation of the distance the satellite is from the earth as the earth and satellite rotate. Finally, the semimajor axis is a measure of the average position of the satellite relative to the center of the earth.

Current three-axis stabilized satellites use separate sets of thrusters to control north-south and east-west motions. The north thrusters produce the required north-south change in satellite velocity, or delta V, to control orbit inclination. The east thrusters and west thrusters produce the required combined east-west delta V to control orbit semimajor axis and eccentricity. For each of these three maneuvers, thrusters are fired in pairs to cancel torques since the thrust directions do not pass through the satellite center of mass. Furthermore, there are three separate maneuvers performed at different times as required by the physics of the various forces. The frequency of these maneuvers are typically every 14 days for both the north-south maneuver and the pair of east-west maneuvers (east and west firings occur approximately ½ orbit apart or about 12 hours) when using 5 pound thrusters with liquid propulsion.

U.S. Pat. No. 5,443,231 entitled "Method And Apparatus For A Satellite Station Keeping" discloses the nominal use of four electric propulsion thrusters to simultaneously correct for orbital inclination, eccentricity, and semimajor axis growth of a satellite orbiting in a synchronous orbit about a central body such as the earth. This is illustrated in FIG. 1 of the cited patent. This requires the thrusters to be canted in the east-west direction by an angle α of at least 10 degrees. This is illustrated in FIG. 2 of the cited patent. It has been determined that the use of method and apparatus disclosed in U.S. Pat. No. 5,443,231 could lead to a significant mass and power penalty in case of a thruster failure (as high as 52% for a satellite mass of 3000 kilograms, electric propulsion Isp of 1620 seconds, and solar array area of 150 square meters). This failure requires extra maneuvers as illustrated in FIG. 3 of the cited patent.

Accordingly, it would be an advantage to have satellite stationkeeping systems and methods that improves upon the teachings of U.S. Pat. No. 5,443,231 and maximizes the payload mass and mission life of satellites in which they are employed.

SUMMARY OF THE INVENTION

The present invention provides for practical methods and apparatus for satellite stationkeeping wherein the satellite electric propulsion system is used only to simultaneously correct orbital inclination and eccentricity growth and the satellite chemical propulsion system is used to correct orbital semimajor axis growth. This system minimizes the total propellant usage in case of an electric propulsion thruster failure and, therefore, maximizes the payload mass and mission life. The satellite electric propulsion system is used at two orbital locations determined by the orbital inclination and eccentricity growth. The satellite chemical propulsion system is used independently from the electric propulsion system. The chemical thruster firing strategy is determined by the satellite station longitude, thruster cant angle and the allowed longitude deviation from the station.

In the present invention, only two electric propulsion thrusters are nominally used compared to four in the system of U.S. Pat. No. 5,443,231. In the present invention, redundant thrusters are used only if the nominal thrusters fail. In the present invention, electric propulsion is used only to correct orbital inclination and eccentricity growth and the satellite chemical propulsion system is used to correct orbital semimajor axis growth. In the present invention, electric propulsion thrusters are canted such that the nominal east-west thrust component is near zero. In the present invention, electric propulsion thrusters are fired at orbital locations away from tire line of nodes to minimize total propellant usage, to correct orbital inclination and eccentricity growth.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 5 is a flow diagram illustrating an exemplary satellite stationkeeping method 40 in accordance with the principles of the present invention.

DETAILED DESCRIPTION

Figure 1:
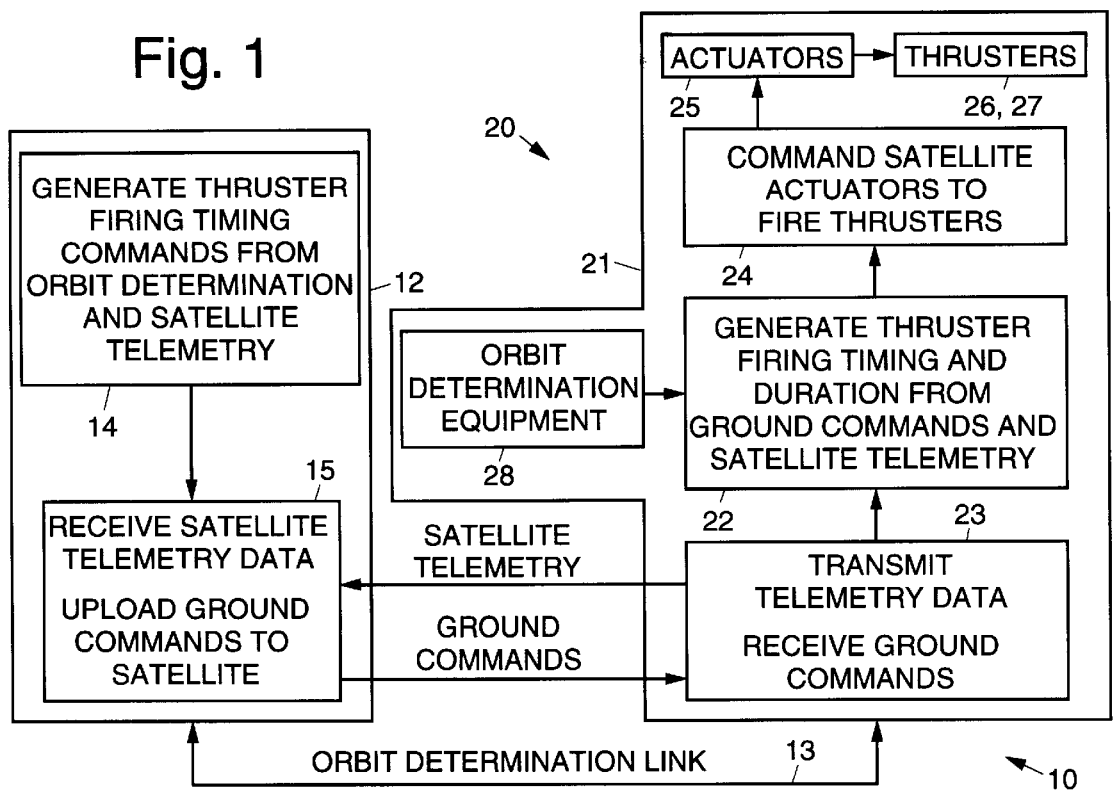
FIG. 1 illustrates satellite stationkeeping apparatus in accordance with the principles of the present invention.
Figure 2:
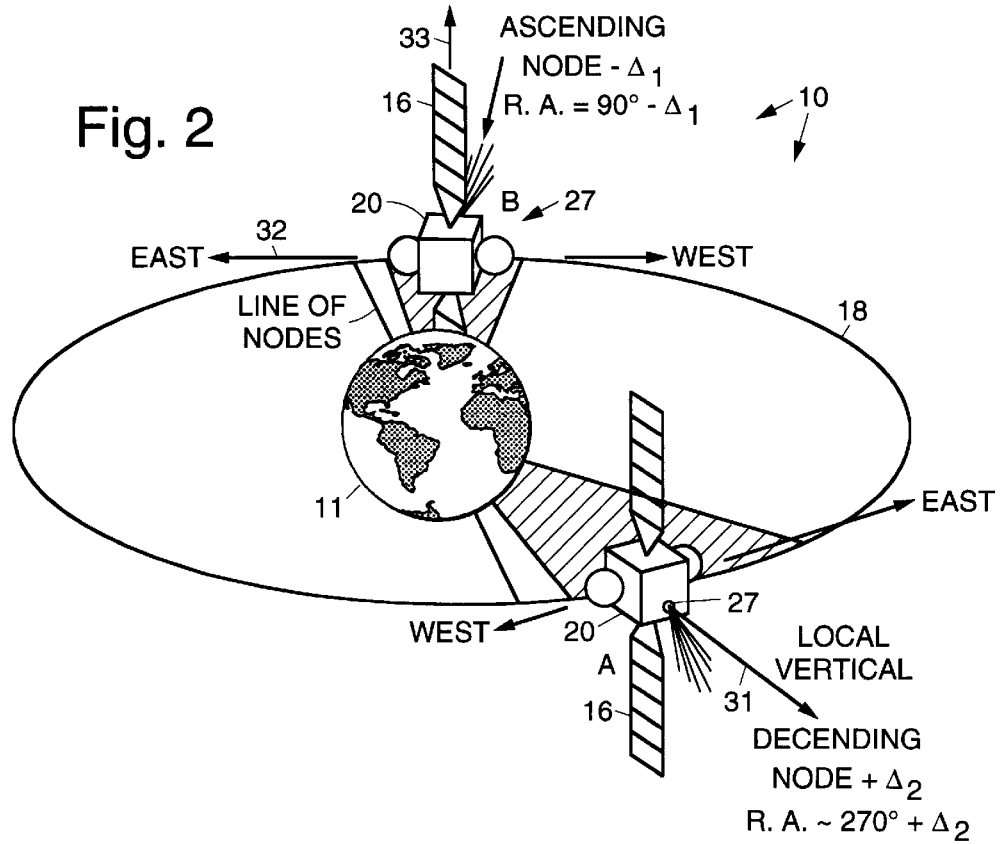
FIG. 2 illustrates a three-axis stabilized satellite in a stationary orbit about the earth in two different positions to illustrate an improved method of satellite stationkeeping in accordance with the principles of the present invention.

FIG. 1 illustrates stationkeeping apparatus 10 in accordance with the principles of the present invention for use in controlling the, motion of a three-axis stabilized satellite 20 in synchronous orbit 18 (FIG. 2) around a central body 11 such as the earth 11 (FIG. 2). The satellite 20 includes one or more solar arrays 16 that are controlled to face the sun. The satellite stationkeeping apparatus 10 comprises ground equipment 12 and satellite-based equipment 21 disposed on the satellite 20 that communicate by way of an orbit determination link 13 or communication link 13 therebetween.

The ground equipment 12 includes a computer 14 or processor 14 containing software that is used to generate thruster firing timing and duration commands derived from orbit determinations and satellite telemetry data received via telemetry equipment 15. The telemetry and command equipment 15 is also used to upload the thruster firing timing and duration commands to the satellite 20.

The satellite 20 includes a computer 22 or processor 22 containing software that is used to generate thruster firing timing and duration commands derived from uploaded thruster firing timing and duration commands received by telemetry and command equipment 23, or generated by orbit determination equipment 28 onboard the satellite 20, and satellite telemetry data generated on-board the satellite 20. The satellite 20 also includes a controller 24 that is coupled between the computer 22 and a plurality of actuators 25. The actuators 25 respectively control firing of chemical and electrical thrusters 26, 27 coupled thereto in response to the thruster firing timing and duration commands generated on-board the satellite 20. Preferably, the electric thrusters 27 are canted away from the solar array 16 by a predetermined angle θ with respect to a north-south axis of the satellite 20 and a near 90° angle from an east-west axis of the satellite 20.

The time duration of each of the two thruster firings is based upon the change in velocity of the satellite 20 along the north (N) and south (S) thrust vector given by the equations:

$$\Delta VN = 0.5 \Delta VNI / \cos \theta \{(1-K \cos LS)^2 + (K \sin LS)^2\}^{0.5}, \text{ and}$$

$$\Delta VS = 0.5 \Delta VNI / \cos \theta \{(1+K \cos LS)^2 + (K \sin LS)^2\}^{0.5},$$

where ΔVN is the change in velocity of the satellite (delta V) imparted by the $S_{1N}$ or $S_{2N}$ north facing electric thruster 27, ΔVS is the change in velocity of the satellite (delta V) imparted by the $S_{1S}$ or $S_{2S}$ south facing electric thruster 27, $K = \Delta VRE / \Delta VNI / \tan\theta$, ΔVNI is the total required normal ΔV to control orbit inclination. ΔVRE is the total required radial ΔV along the sun direction to control eccentricity, and LS is the difference between right ascension of the sun and right ascension of the ascending node of the satellite 20.

ΔVN is imparted at an angle Δ1 from the ascending node of the satellite 20 (FIG. 2), and ΔVS is imparted at an angle Δ2 from the descending node of the satellite 20 (FIG. 2) and are given by the equations:

$$\Delta 1 = -\arctan\{K \sin LS / 1 - K \cos LS)\}, \text{ and}$$

$$\Delta 2 = -\arctan\{K \sin LS / 1 + K \cos LS)\}.$$

Figure 3:
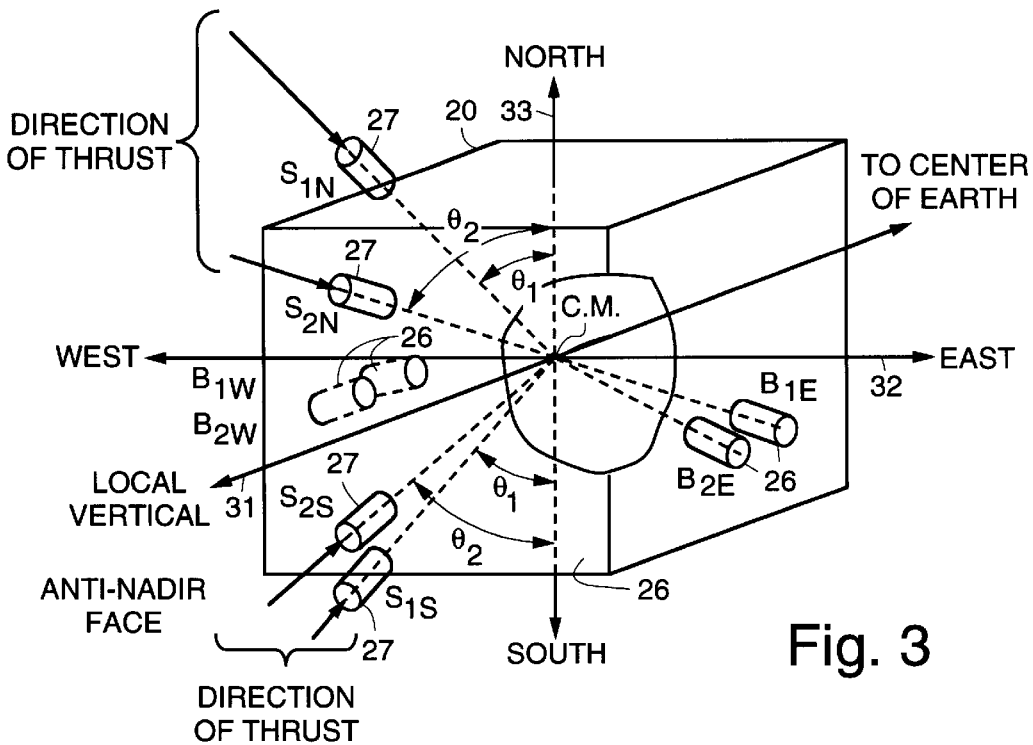
FIG. 3 illustrates a simplified three-dimensional view of a three-axis satellite employing a two-thruster satellite stationkeeping apparatus of the present invention.
Figure 4:
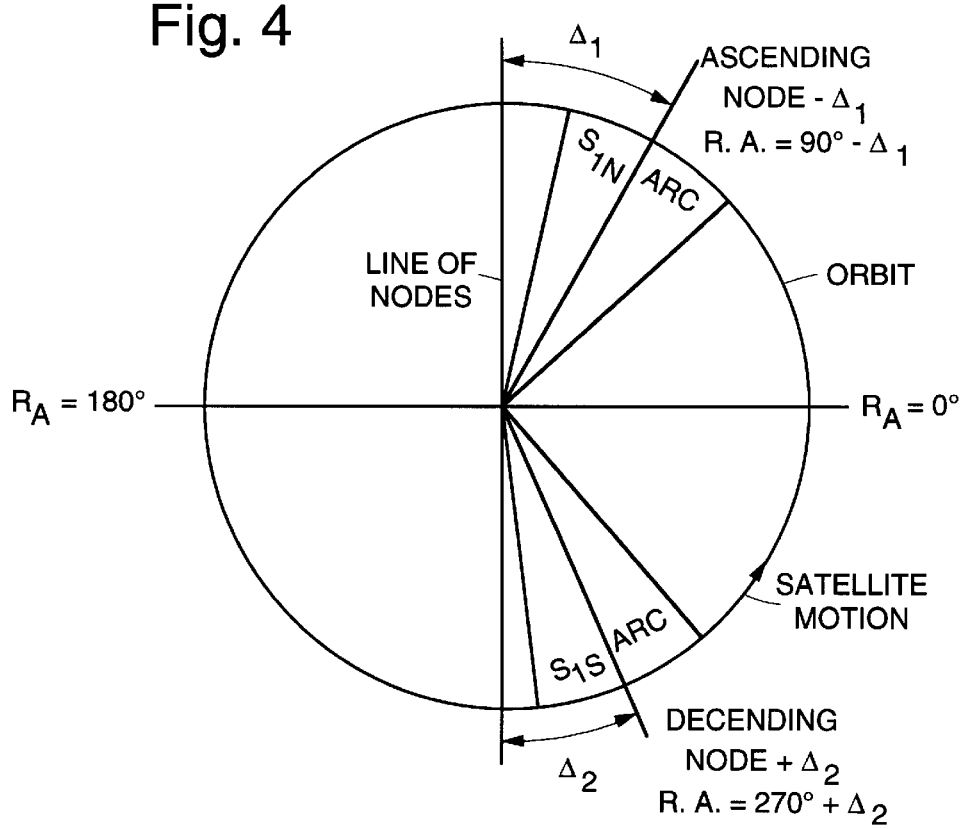
FIG. 4 illustrates burn arcs using each of the north and south thrusters to achieve the nominal satellite stationkeeping as well as in the event of a failure of one of the thrusters in the two thruster apparatus of the present invention.

The present invention will be described in more detail with reference to FIGS. 2–4. FIG. 2 illustrates the three-axis stabilized satellite 20 in a stationary orbit about the earth 11 in two different positions to illustrate the improved satellite stationkeeping apparatus 10 and method 40 in accordance with the principles of the present invention. FIG. 3 illustrates a simplified three-dimensional view of a three-axis satellite 20 employing two-thruster satellite stationkeeping apparatus of the present invention. FIG. 4 illustrates burn arcs using a pair of north and south thrusters 27 to achieve satellite stationkeeping. In the event of a failure of one of the thrusters 27, the other redundant pair of thrusters 27 are used without changing the stationkeeping scheme at the two orbital locations (i.e., no additional maneuvers are required).

The three-axis stabilized satellite 20 in FIG. 2 is shown in a stationary orbit about the earth. A set of local coordinates for the satellite 20 is defined by the local vertical 31, by an east-west axis 32 and a north-south axis 33. The origin of the coordinates is the center of mass (C.M.) of the satellite 20. The local vertical 31 is the line through the earth 11 and satellite 20 which represents the nadir and anti-nadir directions. The nadir direction is the direction toward the earth 11, and the anti-nadir direction is the direction away from the earth 11. FIG. 2 shows the satellite 20 in a first position A and a second position B to illustrate the location where thruster firings take place. The cross-hatching in FIG. 2 is intending to indicate the burn arc of the thrusters 27.

Referring now to FIG. 3, four electrical thrusters 27 ($S_{1N}$, $S_{2N}$, $S_{1S}$, $S_{2S}$) are mounted on the satellite 20. The four thrusters 27 are canted away from the solar array axis by an angle θ (θ1 and θ2 in FIG. 3) so that the thrust lines pass through the satellite center of mass (C.M.) and at the same time minimize the plume impingement on the solar array.

The two electrical thrusters 27 ($S_{1N}$, $S_{1S}$) provide complete control of the two orbit vectors, namely, inclination and eccentricity. Each electrical thruster 27 produces mainly two components of ΔV, i.e. normal and radial (toward the earth 11), since their lines of thrust are directed through the center of mass of the satellite 20.

It is well known that the optimum time for providing north-south corrections to maintain the required inclination is at the ascending and/or descending nodes at right ascension (R. A.) near 90° for negative acceleration (south correction) and near 270° for positive acceleration (north correction). This is because most changes in inclination are produced by forces that rotates the orbit about the line of nodes.

It is also well known that the optimal time for providing radial acceleration to maintain the required eccentricity is at the time when the radial acceleration is pointing to the sun. This is because most changes in eccentricity are produced by the solar radiation forces on the solar array of the satellite.

Now, the present invention takes advantage of the electric thrusters 27 large cant angle θ used to avoid the plume impingement on the solar array. As a result of this cant angle, the thrusters 27 produce acceleration in the north-south direction as well as the radial direction and therefore can be used to optimally correct for both orbital inclination and eccentricity growth. This is achieved by selecting the time in the orbit to provide the appropriate accelerations.

One of the north electric thrusters 27 provides negative normal acceleration and is fired at R.A.≈90°−Δ₁ while one of the south electric thrusters 27 provides positive normal acceleration and is fired at R.A.≈270°+Δ₂. Both thrusters 27 provide negative radial acceleration. The thrust duration is based on the delta VN and delta VS defined above.

Thus, two electric propulsion thrusters 27 (FIG. 3) having a zero nominal east-west cant angle are used to simultaneously correct the orbital inclination and eccentricity growth which require the majority of change in velocity (delta V) correction (about 45 meters/second/year). The orbital semimajor axis growth which requires a maximum delta V correction of only 1.9 meters/second/year is independently performed using the chemical thrusters 26 (e.g., $B_{1E}$, $B_{2E}$, $B_{1W}$, $B_{2W}$ in FIG. 3).

The present invention provides a practical method 40 and apparatus 10 that eliminates the power penalty and significantly reduces the mass penalty compared to the conventional system disclosed in the Background section (e.g., from 52% to about 15% for an electric propulsion thrusters 27 with Isp=1620 second, chemical propulsion thrusters 26 with Isp=210 second, satellite dry mass=3000 kg, and solar array area=150 square meters).

Momentum management is achieved by gimbaling the thrusters 27 to point away from the spacecraft mass center as described in Patent 45,349,532, which is assigned to the assignee of this invention. When the angles Δ1 and Δ2 are sufficiently large, the two north-south stationkeeping maneuvers can together manage momentum about all three axes. However, in other cases (such as Δ1=Δ2=0) the thrust vectors associated with the two maneuvers are too close to parallel to produce sufficient momentum-control authority about all three axes. (It should be noted that when low-force thrusters 27 are used, longer burn times result in a thrust vector which changes from the beginning of the burn to the end of the burn, improving the three-axes momentum-control authority.)

One solution for this momentum-control problem involves breaking each burn into two sub-burns, one on each side of the nominal thrust location. While this solves the momentum-management problem it introduces additional burns that increase the operational complexity of the satellite 20 and increase the number of thruster cycles which may decrease the operating lifetime of the thrusters 27.

A better solution is to perform a two-day stationkeeping cycle that moves the burns to one side of the nominal burn locations for the first day and then moves the burns to the other side of the nominal burn locations for the second day. The burns are arranged such that the two days of stationkeeping combine to produce the necessary stationkeeping for that two-day period. Similarly, this same strategy may be implemented for periods of more than two days. Also note that this strategy may also be used to move burn locations due to eclipse or impingement constraints.

The present invention is also applicable to missions in which the satellite attitude is biased in roll, yaw and/or pitch. The roll and yaw bias have little effect on the total delta V. The pitch bias has also a little effect on the delta V if it is fixed and known before the satellite 20 is launched. In this case, the electric thrusters are aligned at the factory to virtually eliminate their contribution to the orbital east/west delta V. On the other hand, the pitch bias can cause a mass penalty if it vary in-orbit. In this case, the electric thrusters 27 are aligned at the factory to minimize their contribution to the orbital east/west delta V and the chemical thrusters 26 are used to correct the east/west delta V caused by the electric thruster firings. Because the chemical thrusters 26 are used to correct this effect, the power penalty is insignificant but the 15% propellant penalty mentioned above is increased by about 4% per degree of pitch bias. This penalty is still significantly lower than the 52% penalty in the conventional system disclosed in the background section.

The present invention is also applicable to missions in which the satellite station longitude is known before launch. In this case, the electric thrusters 27 are aligned at the factory to impart some of the required orbital east/west delta V so that the sum of the electric and chemical propellant mass is minimized.

For the purpose of completeness, FIG. 5 is a flow diagram illustrating an exemplary satellite stationkeeping method 40 in accordance with the principles of the present invention. The exemplary satellite stationkeeping method 40 includes the following steps.

A satellite 20 having chemical and electric propulsion thrusters 26, 27 is launched 41 into a synchronous orbit 18 around a central body 11. The electric propulsion thrusters 27 are fired 42 at two orbital locations determined by the orbital inclination and eccentricity growth of the satellite 20 to correct north-south drift and east-west drift due to orbital eccentricity growth. The chemical propulsion thrusters 26 are fired 43 to correct east-west drift due to orbital semimajor axis growth and to thus correct orbital semimajor axis growth of the satellite 20. The electric propulsion thrusters 27 may be selectively pointed 44 using gimbals to allow for momentum dumping and/or additional chemical propulsion thrusters 26 may be used to maintain the attitude of the satellite 20 when firing the electric propulsion thrusters 27.

Thus, improved satellite stationkeeping apparatus and methods have been disclosed wherein an electric propulsion system is used to simultaneously correct orbital inclination and eccentricity growth and a chemical propulsion system is used to correct orbital semimajor axis growth. It is to be understood that the described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A method of providing satellite stationkeeping of a satellite launched into a synchronous orbit about a central body, comprising the steps of:

launching a satellite having chemical and electric propulsion thrusters into a synchronous orbit around the central body;

firing the electric propulsion thrusters to correct north-south drift due to orbital inclination growth and east-west drift due to orbital eccentricity growth; and firing the chemical propulsion thrusters to correct east-west drift due to orbital semimajor axis growth.

2. The method recited in claim 1 wherein the electric propulsion thrusters are gimbaled to point the thrust vector to the center of mass of the satellite.

3. The method recited in claim 1 wherein the chemical propulsion thrusters are gimbaled to point the thrust vector to the center of mass of the satellite.

4. The method recited in claim 1 wherein the satellite comprises two electric thrusters and a solar array, and wherein the electric thrusters are canted away from the solar array by a predetermined angle θ with respect to a north-south axis and a near 90° angle from an east-west axis of the satellite.

5. The method recited in claim 4 wherein the time duration of each of the two thruster firings is based upon the change in velocity of the satellite along the north (N) and south (S) thrust vector given by:

$$\Delta VN = 0.5 \Delta VNI / \cos\theta \{(1-K\cos LS)^2 + (K\sin LS)^2\}^{0.5}, \text{ and}$$

$$\Delta VS = 0.5 \Delta VNI / \cos\theta \{(1+K\cos LS)^2 + (K\sin LS)^2\}^{0.5},$$

where ΔVN is the change in velocity of the satellite (delta V) imparted by the north facing electric thruster, ΔVS is the change in velocity of the satellite (delta V) imparted by the south facing electric thruster, K=ΔVRE/ΔVNI/tanθ, ΔVNI is the total normal ΔV to control orbit inclination, ΔVRE is the total radial ΔV along the sun direction to control eccentricity, and LS is the difference between right ascension of the sun and right ascension of the ascending node of the satellite.

6. The method recited in claim 4 wherein ΔVN is imparted at an angle Δ1 from the ascending node of the satellite, and ΔVS is imparted at an angle Δ2 from the descending node of the satellite and are defined by $$\Delta 1 = -\arctan\{K\sin LS / 1 - K\cos LS\}, \text{ and}$$

$$\Delta 2 = -\arctan\{K\sin LS / 1 + K\cos LS\}.$$

7. The method recited in claim 1 further comprising the step of:

selectively pointing the electric propulsion thrusters using gimbals to allow for momentum dumping and/or using additional chemical propulsion thrusters to maintain the attitude of the satellite when firing the electric propulsion thrusters.

8. The method recited in claim 1 wherein when stationkeeping is nominally performed daily, the method further comprises the step of performing incomplete stationkeeping on one or more days such that the total stationkeeping performed over a period of N days meets the required stationkeeping for that N-day period to avoid burn-location constraints.

9. The method recited in claim 8 wherein N is equal to 2.

10. The method recited in claim 1 wherein the electric thrusters are aligned to minimize the total propellant mass when the satellite has roll, yaw, and/or pitch bias.

11. The method recited in claim 1 wherein the electric thrusters are aligned to minimize the total propellant mass when the satellite has a known station longitude range.

12. Satellite stationkeeping apparatus for use with a satellite launched into a synchronous orbit about a central body, comprising:
   ground equipment that includes telemetry equipment and a computer that contains software for generating thruster firing timing and duration commands derived from orbit determinations and satellite telemetry data received by way of the telemetry equipment;
   equipment disposed on the satellite that comprises:
      telemetry equipment;
      a computer coupled to the telemetry equipment containing software for generating thruster firing timing and duration commands derived from uploaded thruster firing timing and duration commands and satellite telemetry data generated on-board the satellite;
      a plurality of chemical thrusters;
      a plurality of electrical thrusters;
      a plurality of actuators coupled to the plurality of chemical and electrical thrusters; and
      a controller coupled between the computer and the plurality of actuators for responding to the thruster firing timing and duration commands generated by the computer and respectively controlling firing of chemical and electrical thrusters, such that the electric propulsion thrusters are fired to correct north-south drift due to orbital inclination growth and east-west drift due to orbital eccentricity growth, and the chemical propulsion thrusters are fired to correct east-west drift due to orbital semimajor axis growth; and
   an orbit determination link coupled between the ground equipment and the satellite.

13. The apparatus recited in claim 12 wherein the electric thrusters are canted away from the solar array by a predetermined angle $\theta$ with respect to a north-south axis of the satellite and a near 90° angle from an east-west axis of the satellite.

14. The apparatus recited in claim 12 wherein the electric propulsion thrusters are fired to correct north-south drift and east-west drift due to orbital eccentricity growth, and the chemical propulsion thrusters are fired to correct east-west drift due to orbital semimajor axis growth.

15. The apparatus recited in claim 12 wherein the computer computes a time duration for two thruster firings based upon the change in velocity of the satellite along the north (N) and south (S) thrust vector given by:

$$\Delta VN = 0.5 \Delta VNI/\cos\theta \{(1-K\cos LS)^2 + (K\sin LS)^2\}^{0.5}, \text{ and}$$
$$\Delta VS = 0.5 \Delta VNI/\cos\theta \{(1+K\cos LS)^2 + (K\sin LS)^2\}^{0.5},$$

where $\Delta VN$ is the change in velocity of the satellite (delta V) imparted by the north facing electric thruster, $\Delta VS$ is the change in velocity of the satellite (delta V) imparted by the south facing electric thruster, $K = \Delta VRE/\Delta VNI/\tan\theta$. $\Delta VNI$ is the total normal $\Delta V$ to control orbit inclination, $\Delta VRE$ is the total radial $\Delta V$ along the sun direction to control eccentricity, and LS is the difference between right ascension of the sun and right ascension of the ascending node of the satellite.

16. The apparatus recited in claim 15 wherein $\Delta VN$ is imparted at an angle $\Delta 1$ from the ascending node of the satellite, and $\Delta VS$ is imparted at an angle $\Delta 2$ from the descending node of the satellite and are defined by $$\Delta 1 = -\arctan\{K\sin LS/1 - K\cos LS)\}, \text{ and}$$
$$\Delta 2 = -\arctan\{K\sin LS/1 + K\cos LS)\}.$$

17. The apparatus recited in claim 15 wherein, when stationkeeping is nominally performed daily, the controller is caused to perform incomplete stationkeeping on one or more days such that the total stationkeeping performed over a period of N days meets the required stationkeeping for that N-day period to avoid burn-location constraints.

18. The apparatus recited in claim 17 wherein N is equal to 2.

19. Satellite stationkeeping apparatus for use with a satellite launched into a synchronous orbit about a central body, comprising:
   equipment disposed on the satellite that contains software for generating thruster firing timing and duration commands derived from orbit determinations; and
   equipment disposed on the satellite that comprises:
      telemetry equipment;
      a computer coupled to the telemetry equipment containing software for generating thruster firing timing and duration commands derived from uploaded thruster firing timing and duration commands and satellite telemetry data generated on-board the satellite;
      a plurality of chemical thrusters;
      a plurality of electrical thrusters;
      a plurality of actuators coupled to the plurality of chemical and electrical thrusters; and
      a controller coupled between the computer and the plurality of actuators for responding to the thruster firing timing and duration commands generated by the computer and respectively controlling firing of chemical and electrical thrusters, such that the electric propulsion thrusters are fired to correct north-south drift due to orbital inclination growth and east-west drift due to orbital eccentricity growth, and the chemical propulsion thrusters are fired to correct east-west drift due to orbital semimajor axis growth.

20. The apparatus recited in claim 19 wherein the electric thrusters are canted away from the solar array by a predetermined angle $\theta$ with respect to a north-south axis of the satellite and a near 90° angle from an east-west axis of the satellite.

21. The apparatus recited in claim 19 wherein the electric propulsion thrusters are fired to correct north-south drift and east-west drift due to orbital eccentricity growth, and the chemical propulsion thrusters are fired to correct east-west drift due to orbital semimajor axis growth.

22. The apparatus recited in claim 19 wherein the computer computes a time duration for two thruster firings based upon the change in velocity of the satellite along the north (N) and south (S) thrust vector given by:

$\Delta VN = 0.5 \Delta VNI / \cos\theta \{(1-K \cos LS)^2 + (K \sin LS)^2\}^{0.5}$, and $\Delta VS = 0.5 \Delta VNI / \cos\theta \{(1+K \cos LS)^2 + (K \sin LS)^2\}^{0.5}$, where $\Delta VN$ is the change in velocity of the satellite (delta V) imparted by the north facing electric thruster, $\Delta VS$ is the change in velocity of the satellite (delta V) imparted by the south facing electric thruster, $K = \Delta VRE / \Delta VNI / \tan\theta$, $\Delta VNI$ is the total normal $\Delta V$ to control orbit inclination, $\Delta VRE$ is the total radial $\Delta V$ along the sun direction to control eccentricity, and LS is the difference between right ascension of the sun and right ascension of the ascending node of the satellite.

* * * * *